U. SMITH.

Folding-Seat for School-Desk.

No. 8,446. Reissued Oct. 8, 1878.

Witnesses:

Charles L. Palmus

Sam'l H. Lane

Inventor:

Uriah Smith 8,446. FOLDING SEATS FOR SCHOOL-DESKS. Uriah Smith, Battle Creek, Mich. Patent No. 163,611, dated May 25, 1875. Filed June 7, 1878.

*To all whom it may concern:*

Be it known that I, URIAH SMITH, of the city of Battle Creek and State of Michigan, have invented an Improved Folding School-Seat, of which the following is a specification:

The object of my invention is to produce a school-seat that will adapt itself to the movement of the body of the student as he sits down or rises up at his desk, enabling him to rise up at his desk without first stepping out into the aisle, as is necessary with other seats. This is accomplished by so constructing the folding device that the rear edge of the seat shall rise instead of the front as the seat is folded up, the front being at the same time carried back from the student, as will appear by reference to the accompanying drawings, making part of this specification.

Figure 1:
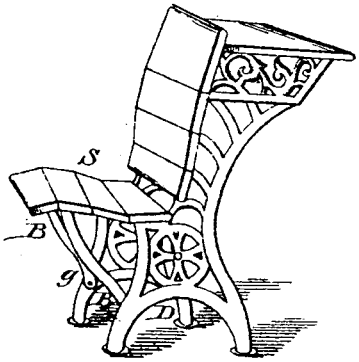
Figure 2:
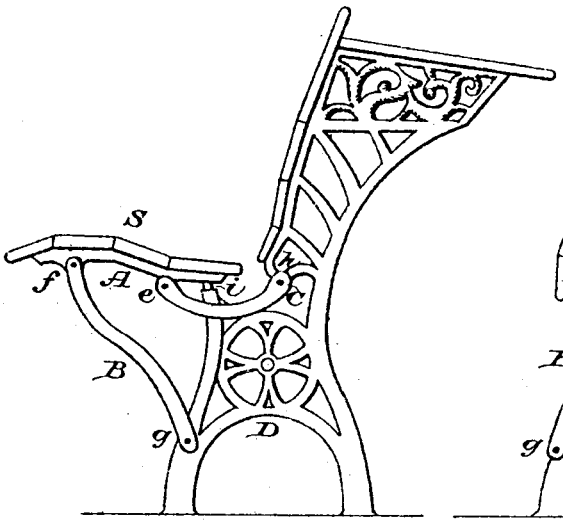
Figure 3:
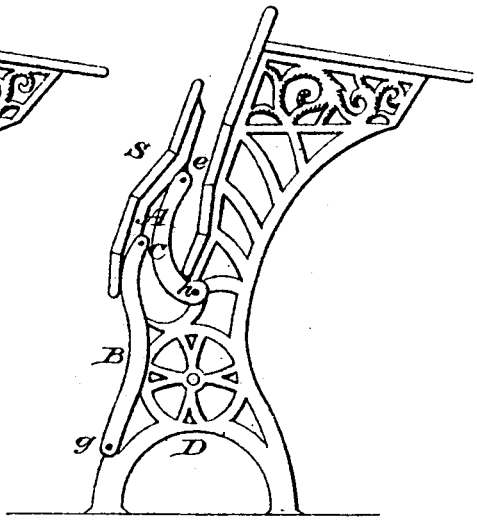

Figure 1 is a perspective view of the seat. Fig. 2 is a side elevation, showing one of the two seat-irons A, front braces, B, lifting-arms C, and standards D of a school seat and desk. Fig. 3 is the same side elevation, showing the position of the different parts when the seat is folded up.

In constructing this seat the seat-irons A, which, with the wooden slats secured thereto, constitute the seat S, are hinged or pivoted at some point near their front end, as at *f*, to the front braces, B, which are themselves pivoted at their lower extremities to the frame or standard at *g*. Back of their pivotal bearings, at *f*, the seat-irons A have another similar bearing or pivot, as at *e*, where they are hinged or pivoted to the arms C, which latter arms are pivoted at their other extremity to some point, as at *h*, on the standard or frame D. When the seat is brought into a position for sitting its downward movement is arrested by the front post of the frame or standard D, when the arms C act as tension-arms, arresting the forward movement of the braces B and holding the seat securely in place.

A seat so constructed cannot be folded up by raising the front of the seat, as in the usual styles of folding seats; but it is folded up by raising its rear edge, its motion being controlled in this respect by the arms C, which are pivoted at such points relatively to the braces B that they carry the rear edge of the seat up, but hold it away from the back, at the same time that the braces B carry the front edge of the seat with nearly a horizontal motion back out of the way of the student. The seat being then in the position shown in Fig. 3, when the student resumes his seat the weight of the body brought upon its upper edge in the act of sitting carries it down to a horizontal position.

Springs may be attached to act at the points *f*, *e*, or *h*, making the seat self-acting.

It will be seen that the peculiarity of my invention consists in folding up the seat from the rear instead of the front, which is accomplished by means of the arms C and braces B, constructed and arranged as herein described and contemplated.

I do not wish to claim the principles of a folding seat in a broad sense, but only the devices for folding it up from the rear instead of the front, and the combination and arrangement of parts whereby the rear edge is caused to rise instead of the front.

I claim as my invention—

1. The combination, with the standard of a desk and the folding seat, of links or arms pivoted, respectively, to the front and rear of said folding seat and to the standard, whereby the seat may be folded into a position substantially parallel with the desk by raising the rear edge of the seat, substantially as shown and described.

2. The combination of the arms C and braces B with the seat S and standards D, constructed to operate substantially in the manner and for the purpose herein set forth.

URIAH SMITH.

Witnesses:
C. C. PEAVEY,
JAMES MCLEAN.